United States Patent [19]

Findlan et al.

[11] Patent Number: 5,514,849
[45] Date of Patent: May 7, 1996

[54] ROTATING APPARATUS FOR REPAIRING DAMAGED TUBES

[75] Inventors: Shane J. Findlan; Gregory J. Frederick, both of Harrisburg; Artie G. Peterson, Jr., Locust, all of N.C.; Wylie J. Childs, Belmont, Calif.

[73] Assignee: Electric Power Research Institute, Inc., Palo Alto, Calif.

[21] Appl. No.: 192,556

[22] Filed: Feb. 7, 1994

Related U.S. Application Data

[63] Continuation-in-part of Ser. No. 18,644, Feb. 17, 1993, Pat. No. 5,430,270.

[51] Int. Cl.$^6$ ................................................. B23K 26/08
[52] U.S. Cl. ................................. 219/121.63; 219/121.8; 376/260
[58] Field of Search ..................... 219/121.63, 121.64, 219/121.78, 121.8, 121.84, 59.1, 60 A, 61.1, 125.11, 136; 228/25, 33, 41; 376/260

[56] References Cited

U.S. PATENT DOCUMENTS

| | | |
|---|---|---|
| Re. 29,815 | 10/1978 | Gnanamuthu . |
| 3,265,584 | 8/1966 | Cooper . |
| 3,310,423 | 3/1967 | Ingham et al. . |
| 3,463,591 | 8/1969 | Franket et al. . |
| 3,762,938 | 10/1973 | Ridemoor . |
| 3,772,496 | 11/1973 | Harendza-Harinxma . |
| 3,941,973 | 3/1976 | Luck, Jr. et al. .......... 219/121.75 |
| 3,943,324 | 3/1976 | Haggerty . |
| 3,947,653 | 3/1976 | Fairbairn . |
| 4,001,543 | 1/1977 | Bove et al. . |
| 4,017,708 | 4/1977 | Engel et al. . |
| 4,029,932 | 6/1977 | Cook . |
| 4,072,147 | 2/1978 | Hett . |
| 4,117,302 | 9/1978 | Earle et al. . |
| 4,122,240 | 10/1978 | Banas et al. . |

(List continued on next page.)

FOREIGN PATENT DOCUMENTS

| | | | |
|---|---|---|---|
| 296436 | 12/1991 | Germany ..................... | 219/121.63 |
| 1-62290 | 3/1989 | Japan . | |
| 2-38846 | 2/1990 | Japan .......................... | 219/60.2 |
| 1162815 | 8/1969 | United Kingdom .......... | 219/60.2 |

OTHER PUBLICATIONS

Brienan, et al, "Processing Materials With Lasers", *Physics Today*, Nov., 1976. pp. 44–50.

J. Lasalle and P. Platz, "A Compact, Concave Grating, Two Detector, Spectrum Analyzer for the Measurement of Electron Temperatures in CTR Plasmas by Ruby Laser Scattering", *Optics Communications*, vol. 17, No. 3., Jun. 1976, 325–7.

D-80MHL Optical Coupler Torque Relief Product, Mitsubishi Corp., Date Unknown.

*Primary Examiner*—Marvin M. Lateef
*Assistant Examiner*—Gregory L. Mills
*Attorney, Agent, or Firm*—Flehr, Hohbach, Test, Albritton & Herbert

[57] ABSTRACT

A laser welding apparatus for clad welding the interior surface of a tube is disclosed. The apparatus includes a rotating sleeve positionable within the tube. Located within the rotating sleeve is a fiber optic cable and a filler passage. The fiber optic cable receives laser energy from a laser. The filler passage receives filler material from a filler metal delivery system that synchronously moves with the rotating sleeve. Positioned at the end of the rotating sleeve is a welding head which includes a head aperture and a laser energy directional modification assembly. The laser energy from the fiber optic cable is transferred through the laser energy directional modification assembly and through the head aperture to a selected weld location on the interior surface of the tube. The filler metal from the filler metal delivery system is also conveyed through the head aperture and intersects with the laser energy at the selected weld location. The filler metal fuses with the interior surface of the tube to produce a clad weld.

11 Claims, 10 Drawing Sheets

U.S. PATENT DOCUMENTS

| | | |
|---|---|---|
| 4,157,923 | 6/1979 | Yen et al. . |
| 4,178,512 | 12/1979 | Früngel et al. . |
| 4,191,475 | 3/1980 | Sourrouille . |
| 4,207,874 | 6/1980 | Choy . |
| 4,212,900 | 7/1980 | Serlin . |
| 4,218,494 | 8/1980 | Belmondo et al. . |
| 4,242,981 | 1/1981 | Bernard et al. . |
| 4,300,474 | 11/1981 | Livsey . |
| 4,323,756 | 4/1982 | Brown et al. . |
| 4,365,136 | 12/1982 | Gottlieb . |
| 4,440,496 | 4/1984 | Milana . |
| 4,495,255 | 1/1985 | Draper et al. . |
| 4,537,793 | 8/1985 | Kehrer et al. . |
| 4,543,270 | 9/1985 | Oprysko et al. . |
| 4,737,011 | 4/1988 | Iri et al. . |
| 4,743,733 | 5/1988 | Mehta et al. . |
| 4,746,540 | 5/1988 | Kawasaki et al. . |
| 4,827,098 | 5/1989 | Kasner et al. . |
| 4,839,495 | 6/1989 | Kitera et al. . |
| 4,978,834 | 12/1990 | Griffaton . |
| 5,006,268 | 4/1991 | Griffaton . |
| 5,066,846 | 11/1991 | Pirl . |
| 5,097,110 | 3/1992 | Hamada et al. . |
| 5,117,086 | 5/1992 | Boudot et al. . |
| 5,140,289 | 8/1992 | Andrieu et al. . |
| 5,151,962 | 9/1992 | Walker et al. . |
| 5,157,745 | 10/1992 | Ames . |
| 5,170,452 | 12/1992 | Ott . |
| 5,177,808 | 1/1993 | Satake et al. . |
| 5,179,260 | 1/1993 | Kroehnert . |
| 5,182,429 | 1/1993 | Pirl . |
| 5,196,671 | 3/1993 | Kroehnert . |
| 5,218,258 | 6/1993 | Shirasu et al. . |
| 5,221,822 | 6/1993 | Duny . |
| 5,221,823 | 6/1993 | Usui . |
| 5,227,605 | 7/1993 | Boudot et al. . |
| 5,271,076 | 12/1993 | Ames . |
| 5,315,684 | 5/1994 | Szegda . |
| 5,359,172 | 10/1994 | Kozak et al. . |
| 5,371,767 | 12/1994 | Pirl . |
| 5,430,270 | 7/1995 | Findlan et al. ............... 219/121.63 |

ROTATING APPARATUS FOR REPAIRING DAMAGED TUBES

This invention is a continuation-in-part of the application entitled "Method and Apparatus for Repairing Damaged Tubes" Ser. No. 08/018,644, filed Feb. 17, 1993, now U.S. Pat. No. 5,430,270 issued Jul. 4, 1995.

BACKGROUND OF THE INVENTION

1. Field of the Invention

This invention relates to the repair of heat exchanger tubes and, more particularly, to the laser weld repair of steam generator tubes in a pressurized water reactor (PWR) nuclear power plant.

2. Description of Related Art

In nuclear power plants utilizing the pressurized water reactor cycle, heat is released in the reactor from the fission of nuclear fuel. The heat is removed from the reactor by continuously circulating fluid called reactor coolant. After being heated in the reactor, the coolant flows to a heat exchanger, commonly referred to as the steam generator, where it gives up heat and then returns to the reactor for further heating. In the steam generator, the nuclear reactor coolant heats a secondary water which is then used to drive a steam turbine. After exhausting from the steam turbine, the steam is condensed and returned to the steam generator for further heating by the reactor coolant. The reactor-steam generator coolant loop is normally referred to as the primary loop and the steam generator-turbine loop is usually referred to as the secondary loop.

The steam generator is typically a shell and tube type heat exchanger with the primary coolant passing through the inside of the heat exchanger tubes and the secondary water passing over the outside surface of the tubes and contained by the shell of the heat exchanger. Heat transfer from the reactor coolant to the secondary water occurs over most of the length of the tubes. To effect a seal at the end of the tubes, and thus prevent mixing of the reactor coolant and the secondary water, the ends of the tubes are connected to a tube sheet comprising a flat plate with apertures therethrough for receiving the ends of the tubes. The ends of the tubes are either seal welded to the tube sheet or expanded in the apertures to effect a sealed joint. The peripheral edges of the tube sheet are sealed to the shell of the steam generator and to a reactor coolant water box.

Steam generators are usually oriented such that the tubes generally run in a vertical direction and can be of the straight through or return flow type. In the straight through type steam generator, the tubes are straight and connected to tube sheets at both ends. The reactor coolant enters a water box at the top of the steam generator, flows through the tubes and is collected in a water box at the bottom of the steam generator. More common is the return flow type steam generator in which the tubes are an inverted "U" shape having both ends connected to the same tube sheet at the bottom of the steam generator. The water box below the tube sheet contains a division plate oriented to effectively seal that portion of the tube sheet containing tube inlets from that portion containing outlets. In this manner, reactor coolant flows into the inlet portion of the water box, through the inverted "U" tubes and into the outlet portion of the water box. In either the straight through or return type steam generator, the tubes are very long and require support along their length. This is accomplished by positioning support plates within the shell of the heat exchanger at various positions along the length of the tubes. The support plates contain apertures through which the tubes pass and have their peripheral edges connected to the shell of the steam generator.

To facilitate installation of the tubes and to allow for differential thermal expansion between the tubes and the shell, the apertures in the support plates are oversized to allow sliding of the tube relative to the support plate. However, the apertures in the plate must be small enough to provide adequate horizontal support for the tubes and to prevent excessive tube vibration during operation. Thus crevices are formed between the support plates and the tubes. These crevices collect debris and corrosion products during operation of the steam generator thereby promoting crevice corrosion. In addition, the joints between the tubes and the tube sheet previously described contain crevices which lead to crevice corrosion.

Steam generator tubes are susceptible to several types of corrosion mechanisms that can ultimately lead to leakage or significant wall thinning. These include primary water stress corrosion cracking, secondary side intergranular attack, secondary intergranular stress corrosion cracking and secondary side wastage. Primary side degradation typically occurs at locations of high tensile residual stress such as expansion transition areas, inner row U-bends, and tube support locations. Secondary side degradation occurs at locations where impurities can concentrate, providing corrosion sites, such as tube-to-tube sheet crevices, tube support plate-to-tube interfaces, anti-vibration bars interfaces, and sludge pile regions. Current mitigation techniques for these corrosion-induced problems include: steam generator replacement, plugging degraded tubes, electroplating tube interior surfaces, and sleeving degraded tubes.

Steam generator replacement is a drastic solution involving substantial capital investment and months or years of plant down time with the attendant loss of revenue accompanying extended plant outages.

Plugging of the degraded tubes takes the tube out of service, reducing the steam generator efficiency. The ability to plug tubes is based on the "plugging margin" that is calculated based on operating experience for each steam generator. Once the "plugging margin" has been expended, further plugging of tubes reduces the capacity of the steam generator and the entire plant must be derated, operated at a capacity less than design.

Electroplating the steam generator tubes with nickel allows the tube to remain in service. Furthermore, nickel plating will seal small leaks and prevent further degradation, but does not restore the structural integrity of the tube. Therefore, a major limitation of electroplating is that it is effective only on small cracks that are detected early so that repair can be accomplished before the strength of the tube is seriously degraded.

Sleeving is a more expensive mitigation technique, but allows the tube to remain in service. Sleeving is accomplished by inserting in the damaged portion of the steam generator tube a short, tubular sleeve having an external diameter slightly less than the internal diameter of the steam generator tube and welding the sleeve to the tube. The sleeve is generally made of the same material as the tube and, in effect, replaces the damaged section of tubing. Therefore the structural integrity of the tube is restored by this method of repair. Sleeving is generally performed when the steam generator "plugging margin" is approached.

One approach to sleeving is disclosed in U.S. Pat. No. 5,066,846 issued Nov. 19, 1991 to William E. Pirl and incorporated by reference herein. In that patent, the sleeve is welded to the tube using a laser beam welding head positioned inside the tube. Laser energy from a laser source is directed through a fiber optic cable to the welding head where a canted mirror reflects the beam onto the interior surface of the sleeve. The weld head rotates in one axial position along the tube near one end of the sleeve and the laser beam delivers sufficient heat to fuse the sleeve to the tube in a narrow, circumferential band around the sleeve/tube interface. The weld accomplished by this method is what is commonly referred to in the art as an autogenous weld in that the base metal of the sleeve and tube are melted and fused and no additional filler metal is added during the welding process. The weld head is then repositioned at the other end of the sleeve and another autogenous weld is accomplished.

Although sleeving in this manner can restore the structural integrity of the tube, it has a number of disadvantages. First, the sleeve necessarily decreases the internal diameter of the tube passage adding increased pressure drop to the flow of coolant through the tube when the steam generator is placed in service. Also, if the repair is located in the lower portion of a tube, such as at the tube sheet, subsequent repair of tube degradation above the location of the first sleeve is prevented because another sleeve of the correct dimensions cannot be inserted past the already installed sleeve. In addition, the autogenous welds at both ends of the sleeve are usually recessed from the end of the tube because it is very difficult to accomplish a quality fillet weld on the end of the sleeve without adding filler metal. Because these welds are recessed from the ends of the sleeves, a crevice remains between the sleeve and the tube in the region between the end of the sleeve and the weld. Also because the welds themselves are narrow, circumferential bands, the external area of the sleeve between the bands forms a crevice with the tube. The damage to the tube which necessitated the repair, such as a crack or a pin hole, allows entrance of water into this crevice. These crevice areas are again susceptible to many forms of corrosion when the steam generator is placed back in service.

Attempts have been made to use a continuous, autogenous weld inside the tube, without the use of a sleeve, in order to repair damaged tubes. These efforts have failed because the corrosion which led to the damage leaves oxidized surfaces which result in flaws and voids when autogenous welding is used. If filler material is used in the welding process, the filler material can contain deoxidizing and viscosity control agents which prevent the flaws and voids associated with autogenous welding. Furthermore, the use of a filler material permits the ability to build-up the tube wall, thus providing full structural replacement of the damaged tube wall with the new weld deposit.

Thus, it is apparent that improved mitigation techniques are needed to meet the future demands of the PWR power plants. Once the tube plugging margin has been used and a large quantity of sleeves (i.e. >10% of the tubes) have been installed to permit continued operation, tube degradation eventually leads to a decision to replace the steam generator, de-rate the plant, or decommission the facility. Alternative repair technology is needed that can provide extended tube service to the end of plant life, at an economical cost.

SUMMARY OF THE INVENTION WITH OBJECTS

It is one object of the present invention to provide a simple and easy method to repair damaged tubes.

It is another object of the present invention to provide a method and apparatus for repair of steam generator tubes without requiring significant disassembly of the steam generator.

It is another object of the present invention to provide a method for repairing crevice corrosion cracking of steam generator tubes.

It is another object of the present invention to provide a method of clad welding the interior of small diameter tubes.

It is another object of the present invention to minimize the requirement of plugging steam generator tubes and the attendant loss in steam generator capacity.

It is another object of the present invention to extend the life of existing steam generators by periodically repairing damaged tubes.

It is another object of the present invention to provide a method and apparatus to accomplish multiple repairs to the same steam generator tube.

It is another object of the present invention to provide a method and apparatus to introduce deoxidizing and viscosity control agents in clad welding for the interior surface of steam generator tubes.

It is another object of the present invention to provide a method and apparatus to fully restore the structural design integrity of the damaged tube wall, by supplying a weld deposit to replace the damaged material.

It is yet another object of the present invention to effect a repair of a leaking steam generator tube, through the application of corrosion resistant weld metal, to reduce its susceptibility to crevice corrosion and primary water stress corrosion cracking.

These and other objects are accomplished with a rotating laser welding apparatus in accordance with the invention. The apparatus includes a rotating sleeve positionable within a steam generator tube. Located within the rotating sleeve is a fiber optic cable and a filler passage. The fiber optic cable receives laser energy from a laser. The filler passage receives filler material from a filler metal delivery system that synchronously moves with the rotating sleeve. Positioned at the end of the rotating sleeve is a welding head which includes a head aperture and a laser energy directional modification assembly. The laser energy from the fiber optic cable is transferred through the laser energy directional modification assembly and through the head aperture to a selected weld location on the interior surface of the tube. The filler metal from the filler metal delivery system is also conveyed through the head aperture and intersects with the laser energy at the selected weld location. The filler metal fuses with the interior surface of the tube to produce a clad weld. A smooth clad welding repair which restores the strength of the tube and leaves no crevices for future corrosion results. In addition, the internal diameter of the tube is very close to the original diameter of the tube, thus obviating pressure drop problems associated with the sleeving type repair and allowing for subsequent repair of the tube at positions axially beyond the weld location.

DETAILED DESCRIPTION OF THE PREFERRED EMBODIMENTS

The present invention is applicable to the repair of corroded or damaged small diameter tubes used in any application such as heat exchangers or material transport systems. The following detailed description of the apparatus and operation of the present invention uses by way of example a specialized heat exchanger known as a steam generator which is used in a pressurized water reactor nuclear power plant cycle.

Figure 1:
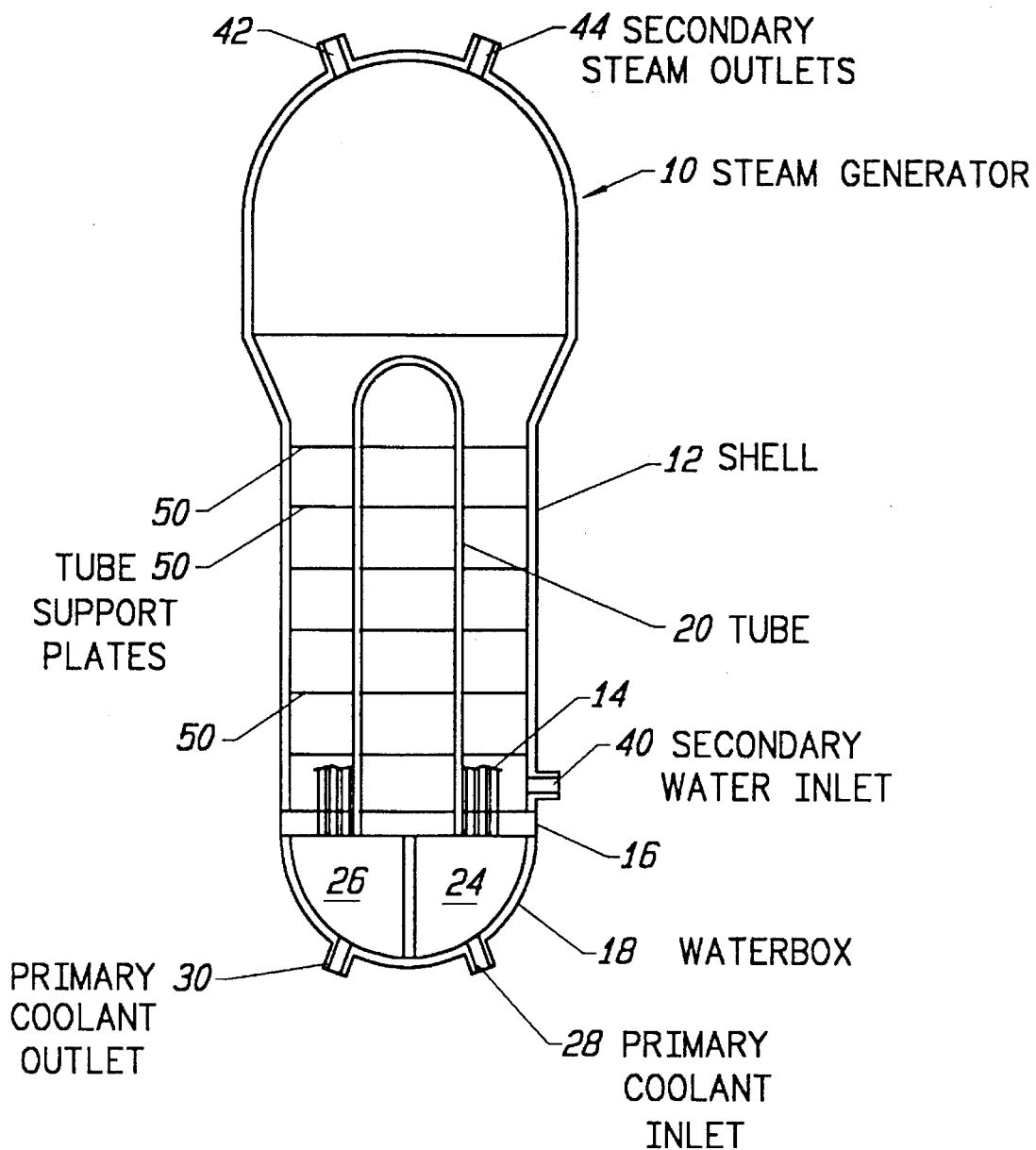
FIG. 1 is a sectional elevation view of a typical steam generator used in a pressurized water reactor power plant.

Turning now to FIG. 1, wherein like numerals designate like components throughout all of the several figures, a typical steam generator of the return type is depicted. The steam generator, generally designated as 10 consists of a shell 12, a tube nest 14, a tube sheet 16 and a water box 18. For clarity in the illustration, only one "U" shaped tube 20 is depicted but it is understood that tube bundle 14 is made up of thousands of individual tubes 20. Division plate 22 divides water box 18 into a first inlet section 24 and an outlet section 26. In operation, hot reactor coolant enters inlet section 24 or water box 18 through nozzle 28. From the inlet section 24, the coolant flows through tubes 20 to the outlet section 26 of the water box and back to the reactor (not shown) through nozzle 30. Secondary water enters the shell 12 through nozzle 40 and is heated by contact with tubes 20. As the secondary water is heated, it boils generating steam which exits the shell 12 at the top of the steam generator 10 through nozzles 42, 44. The steam thus generated is routed to a steam turbine (not shown) where it is expanded to drive an electrical generator (not shown).

In the steam generator, the tubes 20 are connected to tube sheet 16 by seal welding or by expanding the tube within the tube aperture in the tube sheet 16. Located at various heights in the shell 12 are tube support plates 50 containing apertures therethrough for passage of tubes 20. The apertures in tube support plates 50 are slightly larger in diameter than the outside diameter of tubes 20 so that the tubes can slide vertically within the support plates. This relative sliding capability is necessary to accommodate differential thermal expansion which occurs when the steam generator 10 is brought on line and slowly heated to operating temperature. As previously noted, the crevices formed between the support plates 50 and the tubes 20 as well as the crevices located at the attachment of tubes 20 to tube sheet 16 are susceptible to corrosion which degrades the tubes 20 ultimately leading to tube rupture or failure.

Figure 2:
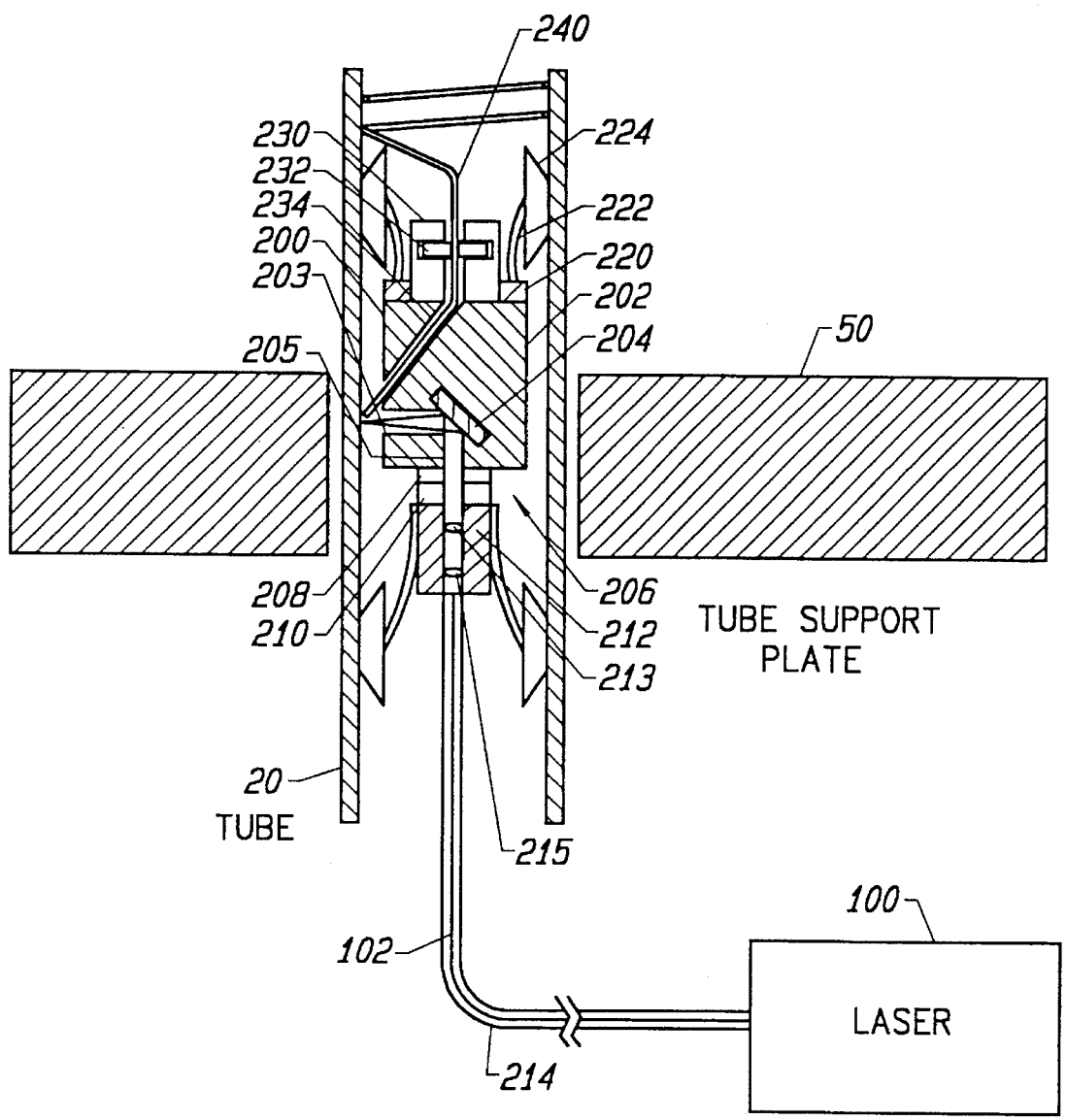
FIG. 2 is a cross-sectional view of one embodiment of the laser clad welding repair apparatus positioned within a steam generator tube and using a pre-positioned coil of wire as the filler metal.

Referring now to FIG. 2, a cross-sectional view of one embodiment of the laser clad welding repair apparatus is depicted. This figure shows the overall installation and use of the invention to clad weld the interior of a small diameter tube. Illustrated is a portion of a steam generator tube 20 where it passes through a tube support plate 50. Typically the clearance between the exterior surface of tube 20 and the internal diameter of the aperture through the support plate 50 is on the order of 0.008 to 0.015 inches. Thus the potential for crevice corrosion is apparent. In this embodiment, the apparatus is positioned within a steam generator tube and uses a pre-positioned coil of wire as the filler metal.

Laser 100 is the heat source for welding the damaged tube 20. The laser 100 can be of any type commonly used for welding but more typically is an Nd:YAG laser. An example of such a laser which has been used by the inventors is a Hobart Laser Products model 2400 which produces 2400 watts of power. Laser 100 is connected to an optical fiber 102 which guides the laser power generated by the laser source 100 to the weld head 200.

Weld head 200 comprises a cylindrical rotary body 202. Housed within body 202 is mirror 204 which is oriented at a predetermined angle in relation to the axis of body 202. As will be discussed below, directional optics may be substituted for the mirror 204. Two passage ways for laser beam light are bored in body 202. The first passageway 203 is concentric with the cylindrical axis of body 202 and enters from its lower surface and terminates at the surface of mirror 204. The second passageway 205 is bored radially from the circumference of body 202 and terminates again at the surface of mirror 204. In this manner, laser beam light entering the bottom of body 202 reflects off mirror 204 radially out to the interior surface of tube 20. Connected to the bottom of body 202 is a rotary joint 206. Rotary joint 206 comprises an upper, rotary portion 208 and a lower, stationary portion 210 and allows the body 202 of weld head 200 to rotate about its axis. Connected to stationary portion 210 of rotary joint 206 is rotating head drive motor 212. Drive motor 212 is a hollow shaft miniature electric or pneumatic motor which provides the rotary force necessary to turn body 202 during operation of the weld head 200. The bottom of motor 212 is connected to flexible cable 214 which connects to laser source 100 and contains optical fiber 102. Cable 214 also includes electrical wires (not shown) to power drive motor 212 if it is electric. In the case when a pneumatic motor is used to drive the weld head 200, cable 214 houses a pneumatic tube (not shown) to drive motor 212. In addition, cable 214 can include conduit (not shown) for the delivery of shielding gas such as argon or helium to improve the final weld as is commonly understood by those skilled in the welding arts. Shielding gas can be delivered through a dedicated tube or conduit, although it is most often forced through gaps between a fiber optics cable, a wire conduit and a sleeve. The gas is then distributed by drilling holes in the weld head to direct the gas toward the welding process.

Because motor 212 has a hollow shaft, laser energy can pass through motor 212 and rotary joint 206 to mirror 204.

Mounted within the hollow shaft of motor 212 are focusing lenses 213 and 215. These lenses can adjust the focal length of the passageway so that the laser energy is concentrated on the interior surface of tube 20. Various methods known to those skilled in the art are available for adjusting the distance between lens 213 and lens 215 which allows the focal length to be adjusted so the same weld head 200 can be used in tubes of different internal diameters.

Mounted on the top of weld head body 202 is ring shaped bearing 220. Bearing 220 is rotatably connected to body 202 to allow relative rotary motion. Connected to rotary bearing 220 and drive motor 212 are leaf springs 222 which have shoes 224 mounted on their distal ends. Leaf springs 222 urge shoes 224 radially outward from the centerline axis of weld head 200. Shoes 224 engage the interior wall of tube 20 and function to hold weld head 200 centered in tube 20 while the weld head is operated. However, the relatively light friction between shoes 224 and tube 20 allow weld head 200 to be easily moved axially within the tube so that the weld head can be accurately positioned for a welding operation.

Also mounted on the top of weld head body 202 and within ring shaped bearing 220 is filler wire feed motor 30. Filler wire feed motors 230 have been used in gas and heliarc welding applications in such industries as the automobile industry. Thus, their construction and operation are generally known in the art. Feed motor 230 has a hollow shaft and a plurality of friction wheels 232 which grip a wire and feed it linearly through the hollow shaft. The axis of rotation for friction wheels 232 is slightly offset from the axis of rotation of the welding head body 202. Therefore, as weld head body 202 is rotated, the friction wheels impart a linear motion to wire held between the tangentially engaging surfaces of the wheels. The hollow shaft of feed motor 230 terminates at the lower edge of motor 230 in alignment with filler wire guide 234. Filler wire guide 234 is a bored passageway through weld head body 202. The upper entrance to guide 234 is centered in the upper surface of body 202 and the lower exit of guide 234 is at the side of body 202 directly above the radial exit of laser beam passageway 205. In this manner, wire fed through guide 234 is directed to the location of welding. Above weld head 200 is depicted filler wire 240. Filler wire 240 is made of a similar material as tube 20. Preferably, an Inconel® alloy with a higher chromium content than the tube material is used to reduce susceptibility to corrosion cracking. Inconel® alloy 625, 52 or 72 may be used and can include deoxidizing and viscosity control agents such as silicon and titanium. Filler wire 240 is preshaped into a coil having an exterior diameter which approximately coincides with the interior diameter of tube 20. Friction between coiled filler wire 240 and the interior surface of tube 20 holds the wire in place during operation of the weld head 200. The lower end of filler wire 240 passes through friction wheels 232 in wire feed motor 230 into guide 234 and out the side of body 202 to the location of the weld. Weld head 200 is positioned within tube 20 at the location of the repair. Weld head 200 redirects the laser energy from the optical fiber in a radial direction against the interior wall of tube 20.

The following describes the procedure and operation used to accomplish a tube repair with the present invention. First, filler wire 240 is coiled so that the outside diameter of the coil approximately matches the internal diameter of tube 20. The lower end of wire 240 is bent to the center of the coil and then bent downward so that the end will lie on the centerline of the tube 20 after the coil is inserted in the tube. The coil of filler wire is then inserted into the tube 20 and pushed to a position slightly above the intended weld repair. The coil can be moved in the tube without deforming its shape by using a flexible hollow hose of outside diameter slightly less than the internal diameter of tube 20. After the wire coil has been positioned, the weld head 200 is inserted into the tube 20, wire feed motor 230 first. Insertion of the weld head 200 is accomplished by compressing shoes 224 radially inward and then inserting the weld head 200 into tube 20. The weld head 200 is then pushed within the tube by feeding cable 214 into the tube 20 until weld head 200 is positioned at the location of the repair. When weld head 200 reaches the proper location, the end of filler wire 240 coil which was previously positioned, will feed into the center of wire feed motor 230 and be engaged by friction wheels 232. To commence welding, power, either electric or pneumatic, is applied to drive motor 212 which rotates weld head body 202. Rotation of the weld head body 202 causes wire feed motor 230 to feed wire 240 through wire guide 234 to the interior wall of tube 20. At the same time, the laser source 100 is turned on and laser energy is transmitted to the internal wall of tube 20 via optical fiber 102 and mirror 204. Weld head 200 can be moved axially within tube 20 by pulling on cable 214. Alternately, a precision thread connection, well known to those skilled in the art, between weld body 202 and ring bearing 220 can accomplish uniform axial advance of the weld head body 202 during the welding operation. Thus as weld head body 202 rotates, the base metal of tube 20 is melted while filler wire is fed to the location of the weld and melted simultaneously thereby producing a clad weld.

Figure 3:
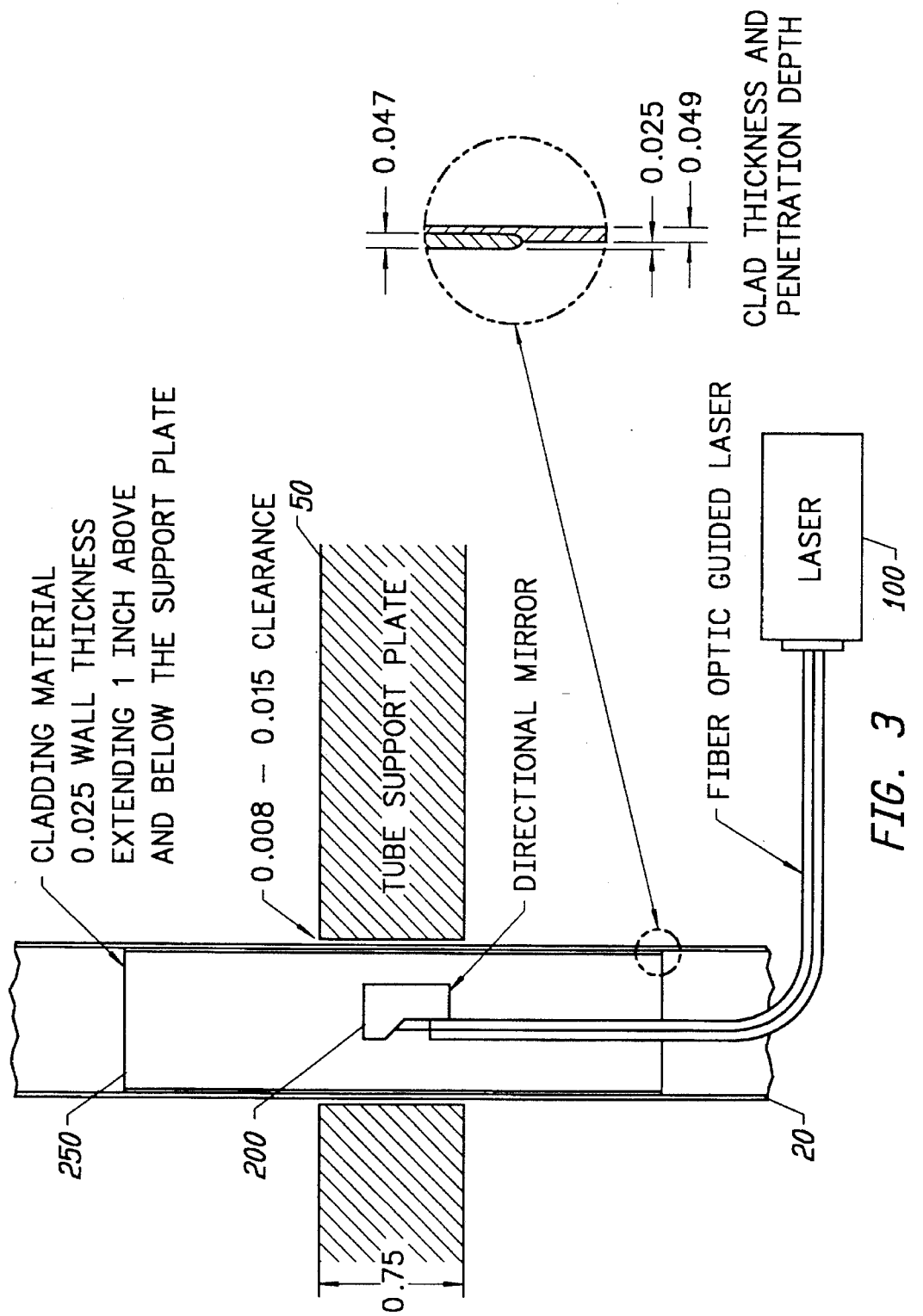
FIG. 3 is a simplified cross-sectional view of another embodiment of the laser clad welding apparatus positioned within a steam generator tube near a tube support plate and welding a pre-positioned thin sheet of filler metal to the interior of a tube.

Referring now to FIG. 3, a simplified cross-sectional view of another embodiment of the laser clad welding apparatus is depicted. In this embodiment, a thin sheet 50 of weld filler material is used in lieu of the filler wire 240 previously described. The weld filler material used in the sheet can have deoxidizing and viscosity control agents as previously described for the filler wire 240. The sheet 250 of filler metal is approximately 0.025 inches thick and is bent into the form of a hollow cylinder having a length to coincide with the length of the tube section to be repaired. (The thickness of the filler metal is determined by the desired build up or clad thickness). The external diameter of the cylinder thus formed is approximately equal to the internal diameter of tube 20 and therefore the cylinder can be pre-positioned in a manner similar to that previously described for the wire coil. After the cylinder is pre-positioned, the weld head 200 is inserted in the tube and the weld is accomplished in the same manner. The resulting weld yields a uniform cladding which decreases the internal diameter of the tube by only 0.050 inches. Penetration depth of the weld is approximately 0.022 inches resulting in a clad thickness of 0.047 inches and an excellent bond is effected between the thin sheet 250 and the tube 20. A clad thickness of 0.047 inches fully restores the original wall thickness and structural integrity of the tube, which has a nominal thickness of 0.042 inches. It will be appreciated that the penetration and clad thickness is governed by selected welding parameters (laser output, travel speed, pitch, foil thickness, etc.).

Figure 4:
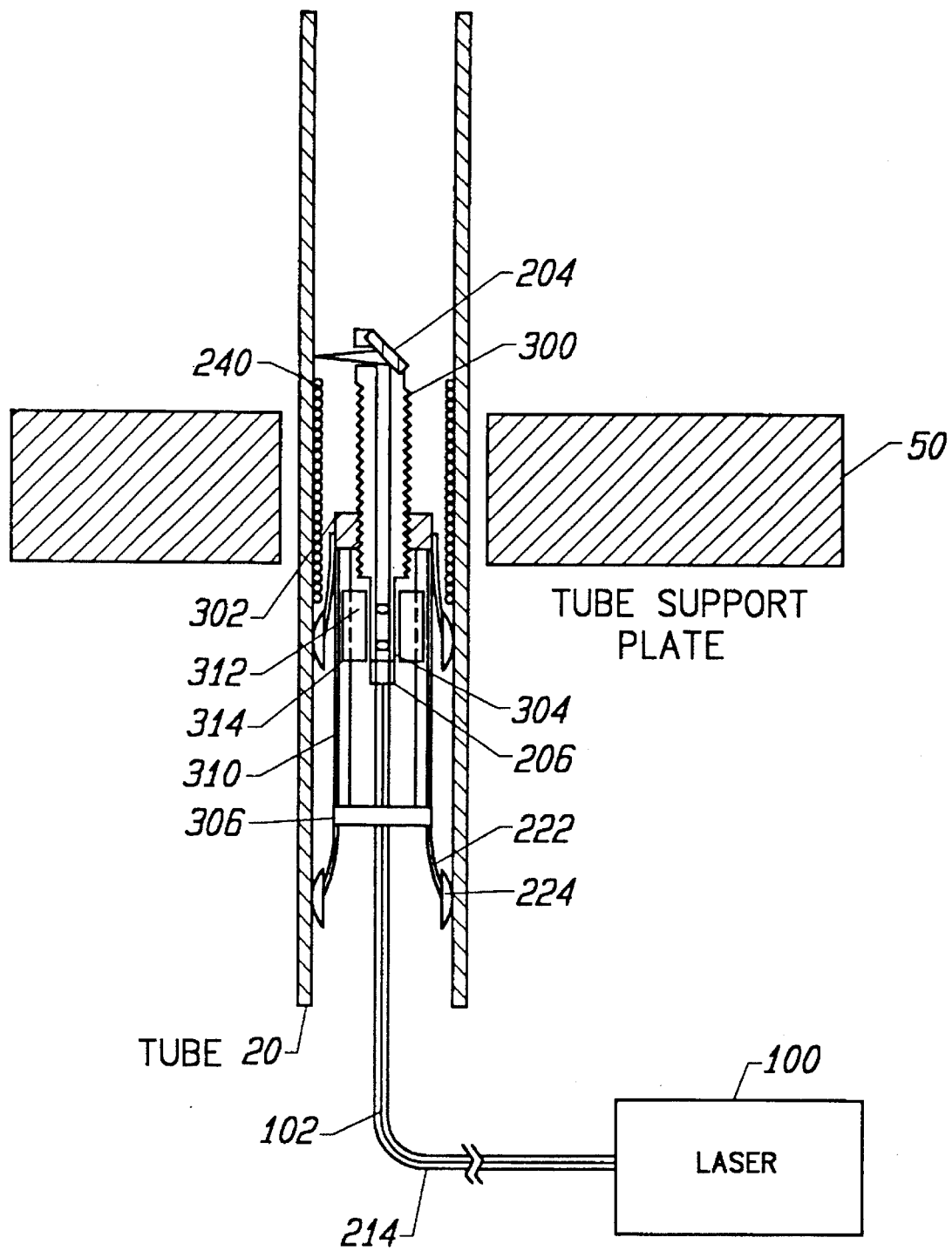
FIG. 4 is a cross-sectional view of an alternate embodiment of the laser clad welding repair apparatus positioned within a steam generator tube and using a coil of fill metal wire pre-positioned directly over the area to be clad welded.

Turning now to FIG. 4, a third embodiment of the present invention is depicted. FIG. 4 shows a simplified cross-sectional view of an alternate embodiment of the laser clad welding repair apparatus positioned within a steam generator tube and using a pre-positioned coil of fill metal wire directly over the area to be clad welded. In this embodiment, weld head 200 consists of a hollow, threaded rod 300 with mirror 204 mounted on top at a predetermined angle, say a forty-five (45) degree angle. Rod 300 screws into circular and internally threaded upper end plate 302. The lower end of rod 300 serves as the armature 304 for drive motor 212. Upper end plate 302 is connected to a washer shaped lower end plate 306 by guide rods 310. Lower and upper end plates 306, 302 are held in position within tube 20 by leaf springs 222 and shoes 224. Guide rods 310 are "T" shaped in cross section and are positioned parallel to the axis of rod 300 with center flanges facing radially inward toward the center of the weld head apparatus 200. The stator 312 of motor 212 has longitudinal grooves 314 on each side which accept the edges of guide rods 310. The bottom of motor armature 304 is attached to rotary joint 206 which in turn is attached to cable 214.

In operation, a tightly wound coil of filler wire 240 is prepositioned within tube 20 directly over the area to be clad welded. Weld head 200 is then inserted in the tube so that mirror 204 is slightly above the top of wire 240. When laser energy is supplied to the weld head 200 and motor 212 is energized, rod 300 and mirror 204 rotate directing laser energy onto the coil of wire 240. In addition, rod 300 threads into upper plate 302 causing the weld beam to travel axially downward through coiled wire 240 at a rate which is synchronized with its rotary motion. To accommodate the axial movement of rod 300, motor stator 312 slides along guide rods 310 but is prevented from rotating by grooves 314 which are engaged with the edges of guide rods 310. Thus the laser beam rotates and travels axially within the tube fusing wire 240 to the interior surface of tube 20 producing a uniform clad weld.

Figure 5:
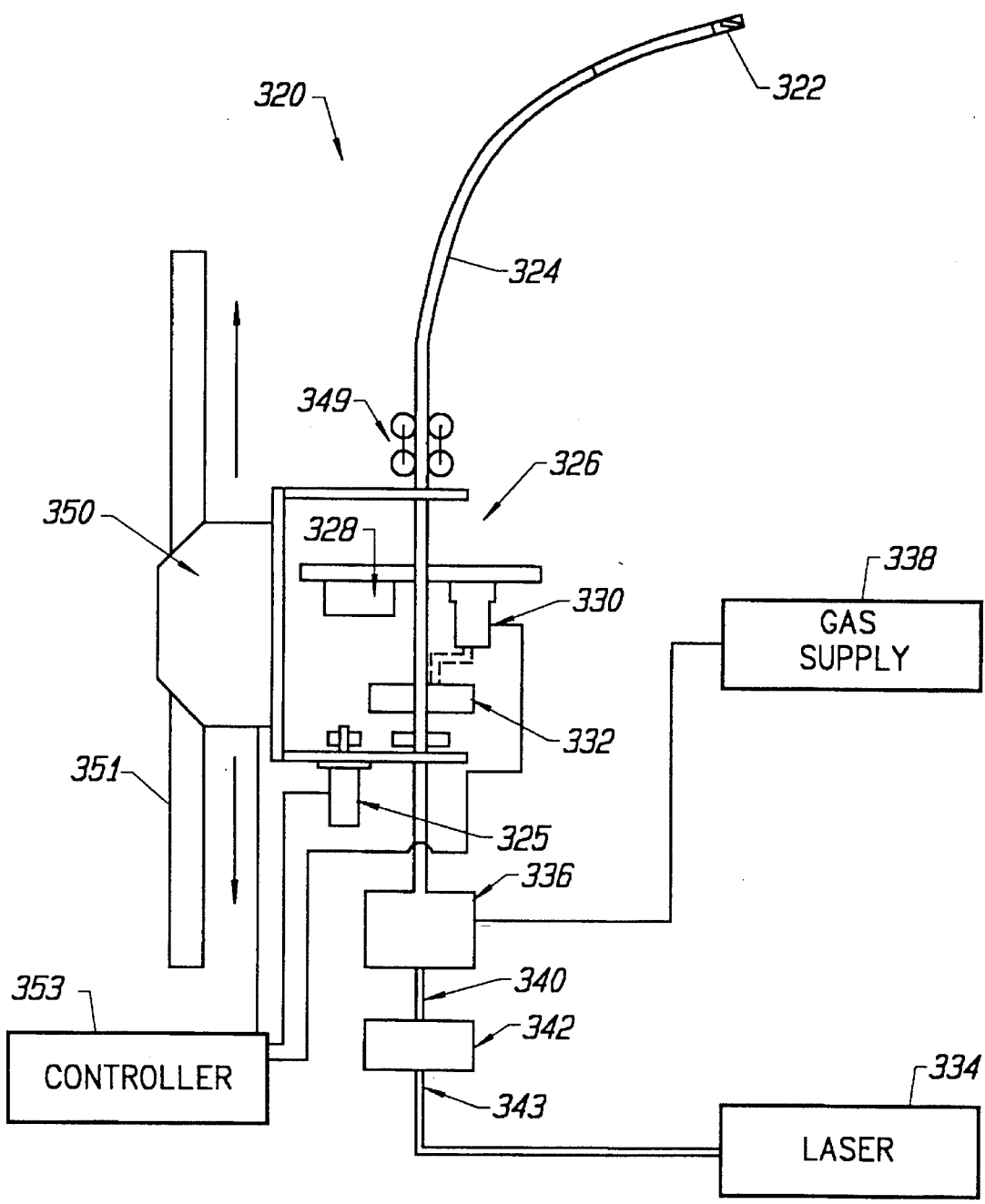
FIG. 5 is a side view of a rotating apparatus utilized in accordance with the present invention.

FIG. 5 illustrates an alternate embodiment of the invention wherein a rotating apparatus 320 is used to repair damaged tubes 20. In this embodiment, the rotating head drive motor 212 and the accompanying rotary joint 206 utilized in the embodiments of FIGS. 2–4 is substituted with a number of rotating elements. Specifically, a rotating welding head 322 is positioned at the end of a rotating sleeve 324. A rotating drive mechanism 325 rotates the sleeve 324.

The rotating drive mechanism 325 simultaneously rotates a filler assembly 326 that includes a filler metal receptacle 328 and a filler metal delivery system 330. The filler metal receptacle 328 holds the filler metal to be welded. Generally, the filler metal receptacle 328 will be in the form of a reel of filler metal wire. The filler metal delivery system 330 receives the filler metal and delivers it to a filler passage within the rotating sleeve 324. Since the rotating sleeve 324 and the filler assembly 326 rotate synchronously, the filler metal does not become tangled.

The filler metal delivery system 330 is powered through filler assembly slip rings 332. The speed of the wire feed motor can be varied to permit different wire feed speeds, providing control of clad thickness and to allow adjustment for variations in laser output levels, travel speed, rotational pitch, and other factors.

The rotating apparatus 320 also includes a gas coupler 336 that is connected to a gas supply 338. The rotating sleeve 324 includes a rotating fiber optic cable 340. A laser 344 supplies energy to a fixed fiber optic cable 343. The laser energy is transferred from the fixed fiber optic cable 343 to the rotating fiber optic cable 340 through an optical coupler 342.

The rotating apparatus 320 is moved along its longitudinal axis by an axial drive system 350 mounted on shaft 351. Guide rolls 349 may be used to guide the rotating sleeve 324 into position. A computer controller 353 is used to control the operation of the rotating apparatus drive mechanism 325, the axial drive system 350, and the filler metal delivery system 330. In particular, the computer controller 353 is used to set the speed of the rotating apparatus drive mechanism 325, the position for the axial drive system 350, and the filler delivery rate for the filler metal delivery system 330.

Figure 6:
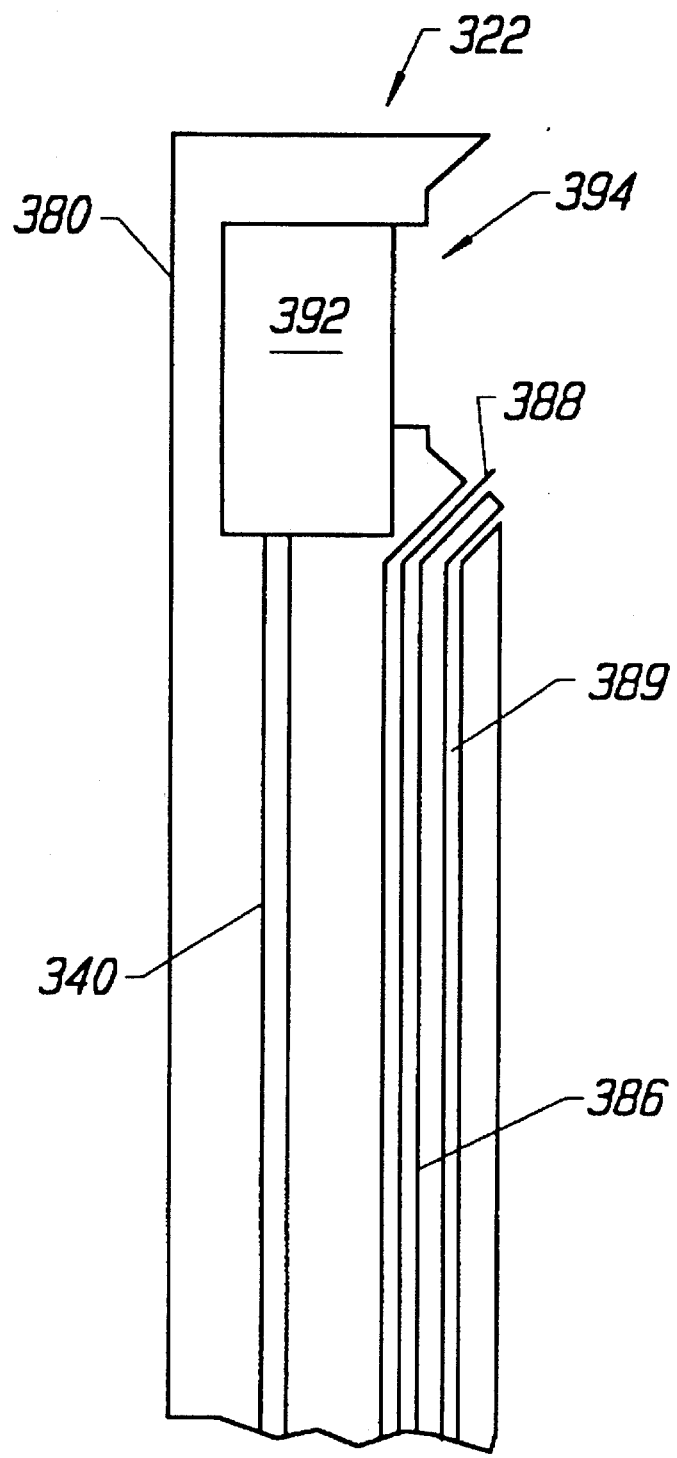
FIG. 6 is a side cross-sectional view of a rotating welding head positioned at the end of the rotating sleeve of the rotating apparatus of FIG. 5.

The operation of the rotating apparatus 320 is more fully appreciated with reference to FIG. 6 which provides an enlarged cross-sectional view of the rotating welding head 322. The rotating welding head 322 includes a body 380 which defines a filler passage 386. The filler passage 386, also called the "wire conduit" runs the length of the rotating sleeve 324. Filler 388 is forced from the filler metal delivery system 330 through the filler passage 386 to a body aperture 394. The laser energy is delivered through the body aperture 394 and welds the filler 388. Gas conduit 389 delivers a shielding gas to the welding head 322. Preferably, the gas conduit 389 terminates in distribution channels (not shown) that distribute the gas to the aperture 394 at a number of locations.

FIG. 6 also depicts the rotating fiber optic cable 340 positioned within the body 380 of the rotating welding head 322. The rotating fiber optic cable 340 runs the length of the rotating sleeve 324 and is affixed thereto.

Figure 7:
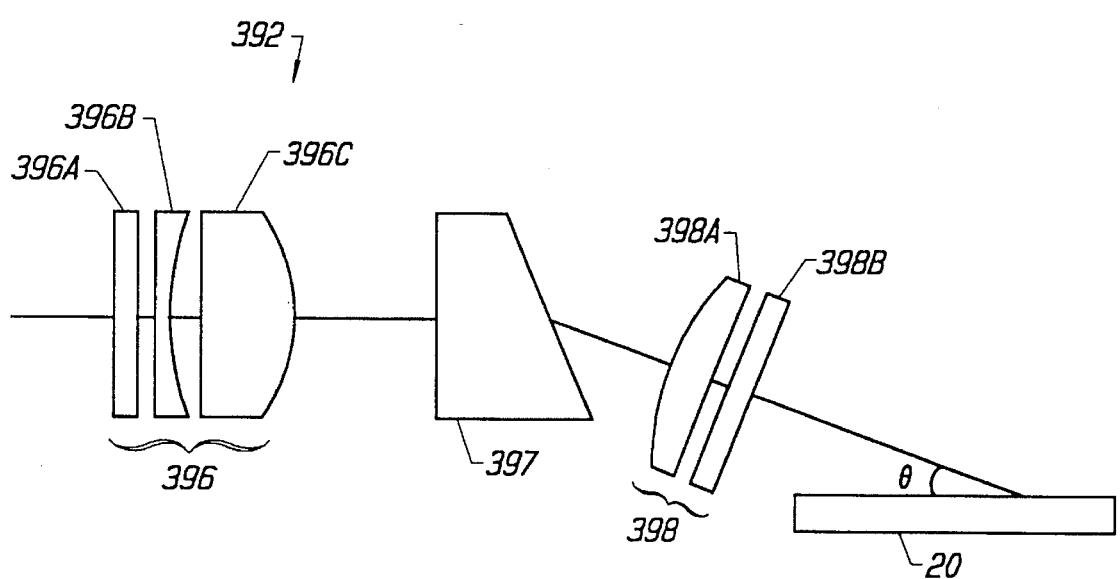
FIG. 7 is a side view of a laser energy directional modification! assembly implemented with a wedge prism.

The rotating fiber optic cable 340 terminates at a laser energy directional modification assembly 392. In the previous embodiments of the invention, the laser energy directional modification assembly 392 was disclosed in the form of a mirror 204. The assembly 392 may also be formed as an optical assembly. FIG. 7 discloses an alternate laser energy directional modification assembly 392 that includes an input lens assembly 396, a wedge prism 397, and an output lens assembly 398. The wedge prism 397 serves to change the direction of the laser energy. The wedge prism 397 provides higher laser energy throughput than is available from a mirror 204.

Figure 8:
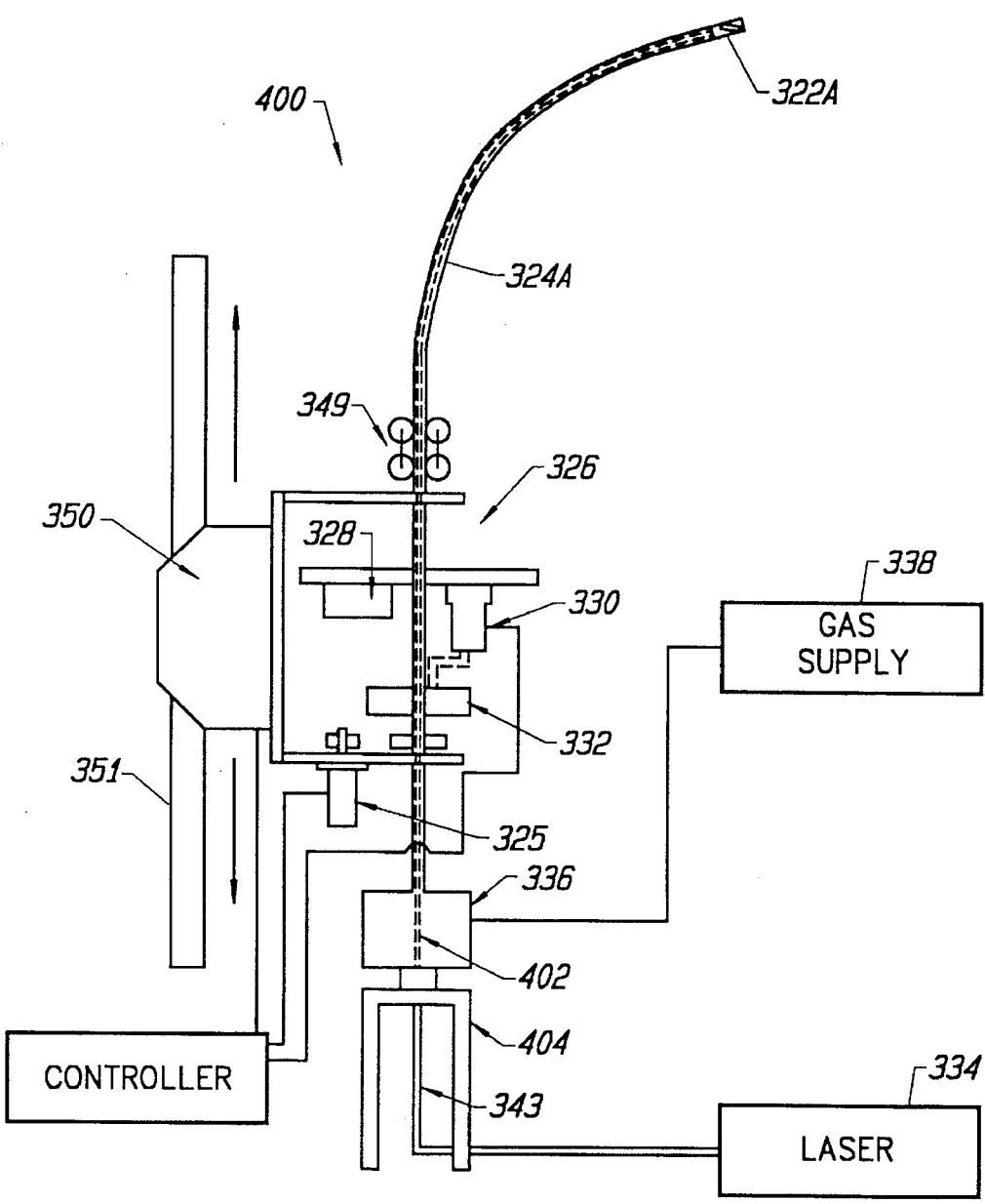
FIG. 8 is a side view of an alternate rotating apparatus utilized in accordance with the present invention.

Preferably, the laser energy is directed toward the receiving surface at a non-orthogonal angle. Prior art devices use a mirror to direct the laser energy to the surface in such a manner that the laser energy impinges upon the surface in an orthogonal manner. In this configuration, reflective laser energy disrupts the incoming laser energy. In addition, a plume and spatter is produced which must be removed by conventional techniques to prevent damage to the optics. When the laser energy is impinged upon the surface 20 to be welded at an angle of say 45° as shown in FIG. 7, then reflective laser energy does not disrupt the incoming laser energy. FIG. 8 depicts another embodiment of the invention. The embodiment of FIG. 8 generally corresponds with the embodiment of FIG. 5, however a fixed interior tube 402 is positioned within the rotating sleeve 324. The fixed interior tube 402 allows a fixed fiber optic cable 343 to remain stationary while the rotating sleeve 324A rotates. In other words, unlike the embodiment of FIG. 5, the fiber optic cable of FIG. 8 does not rotate. Since the fiber optic cable does not rotate, the optic coupler 342 of FIG. 5 is not required. Instead, a fixed interior tube support 404 is utilized.

Figure 9:
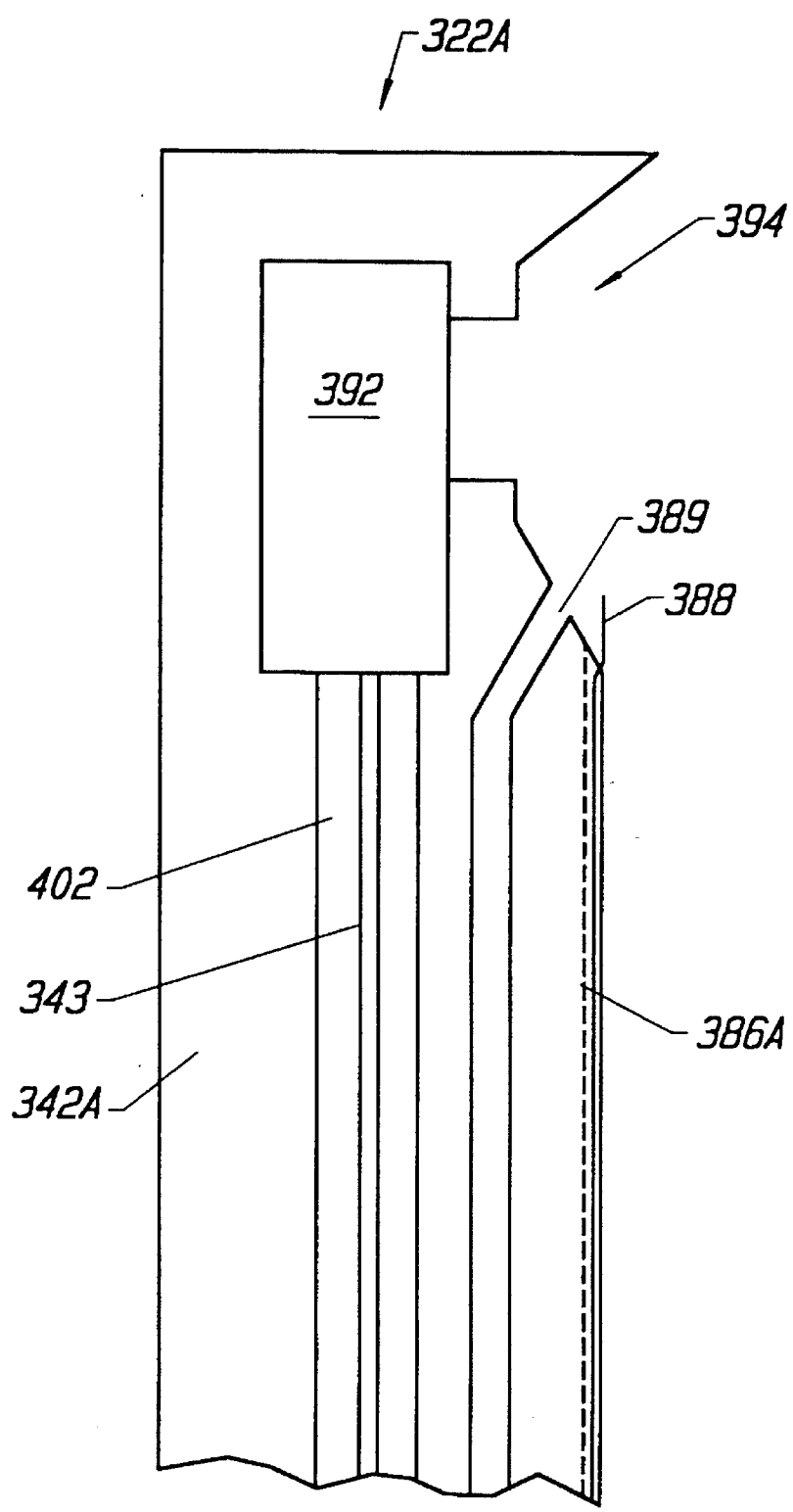
FIG. 9 is a side cross-sectional view of a rotating welding head positioned at the end of the rotating sleeve of the rotating apparatus of FIG. 8.

FIG. 9 illustrates a rotating welding head 322A that may be used with the apparatus of FIG. 8. The figure illustrates a fixed fiber optic cable 343 positioned within a fixed interior tube 402. The rotating sleeve 324A rotates about the fixed interior tube 402. The rotating sleeve 324A includes a gas conduit 389. The rotating sleeve 324A includes a machined groove 386A (shown in phantom) that serves as the filler passage. The filler passage 386A runs the length of the rotating sleeve 324A. The filler passage may also be formed as a small tube running the length of the rotating sleeve 324A. In this embodiment, the laser energy directional modification assembly 392 rotates with the rotating sleeve 324A and receives the laser energy from the stationary fiber optic cable 343.

Figure 10:
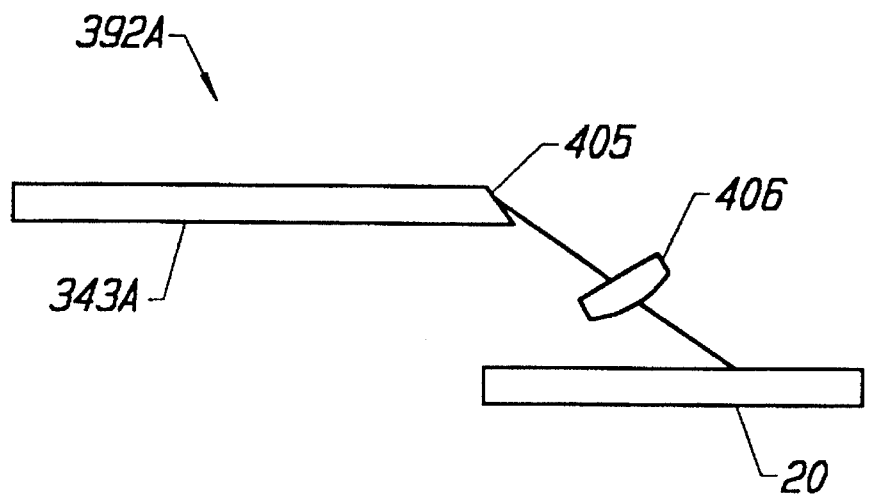
FIG. 10 is a side view of a laser energy directional modification assembly implemented with a cut fiber optic cable.

An alternate embodiment of the directional modification assembly 392A is illustrated in FIG. 10. In this embodiment, the fiber optic cable 343A is beveled at its output end 405 to form a wedge. This structure creates the same effect as the wedge prism illustrated in FIG. 7. This embodiment provides the laser energy directional modification that previously required either a wedge prism or mirror. The laser beam exits the fiber 343A at a non-orthogonal angle and is directed through a focusing lens 406 toward the weld location. A benefit of this design is that it reduces the number of optical elements (i.e., collimating lens, intermediate focusing lens, and wedge prism) and, therefore, reduces the energy losses at each interface and the overall cost of the optical head.

Figure 11:
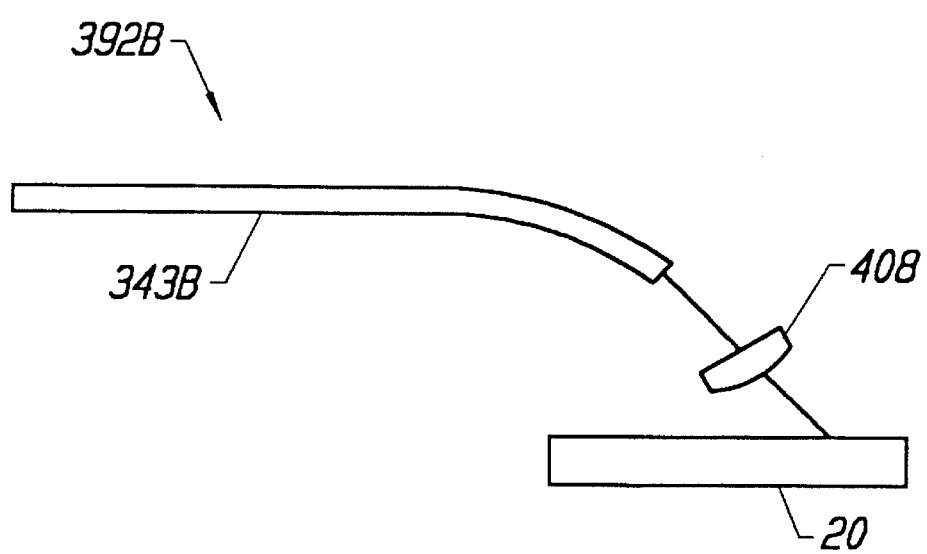
FIG. 11 is a side view of a laser energy directional modification assembly implemented with a bent fiber optic cable.

FIG. 11 illustrates an alternate laser energy directional modification assembly 392B. In this embodiment, the fiber optic cable 343B is bent to obtain a pre-selected non-orthogonal angle relative to the surface 20. The laser energy output from the fiber optic cable 343B is directed through a focusing lens 408 toward the weld location on surface 20. This embodiment of the directional modification assembly eliminates a number of optical elements and thereby reduces energy losses.

The embodiments of FIGS. 5–11 have been implemented using a Hobart 2400 Watt laser with a 1064 nanometer wavelength, from Hobart Laser Products, Inc., Livermore, Calif. The optical coupler 342 of FIG. 5 is commercially available from Hobart Laser Products, Inc., Livermore, Calif.

The optical cable used in the invention is preferably formed of fused silica fiber encased in a metallic, flexible sheath. The fiber is coated with a reflective coating to prevent surface absorption of the laser beam and to enhance transmission. The optical cable may have a 600–800 micron spot size. The rotating sleeve 324 may be formed of stainless steel or a flexible metallic tubing.

The rotating sleeve 324 has been implemented with a circular sleeve with an outer diameter of 0.5 inches and an inner diameter of 0.370 inches. The filler passage 386 size is governed by the filler wire size. The filler passage 386 size is preferably a few thousandth of an inch greater than the diameter of the wire. Wire diameters commonly utilized include 0.020, 0.025, 0.030, and 0.035.

The gas coupler 336 is held stationary and the sleeve 324 is allowed to rotate freely through the coupler 336. The gas coupler 336 includes O-rings to allow rotation of the sleeve 324, while maintaining gas pressure within the coupler 336. The sleeve 324 has holes in it to allow gas to be transferred from the gas supply 338 to the interior of the sleeve 324. The gas is then delivered to the weld head 322 through gas conduit 389. Instead of using a dedicated gas conduit 389, gaps may be provided between the fiber optics cable 340, wire conduit 386, and sleeve 324.

The rotating apparatus drive mechanism 25 is preferably a stepper motor. The drive mechanism 325 is coupled to the rotating sleeve 324 and the filler assembly 326 by conventional techniques, such as gears or belts.

The axial drive system 350 has been implemented using a stepper motor mounted on a shaft 351. Horizontal or planar motion may be obtained by manually positioning the shaft 351. In the alternative, the shaft 351 may be positioned in a motorized planar movement device (not shown), that allows the rotating apparatus 320 to be positioned at any selected tube 20.

The filler metal delivery system 330 may be of the type used in existing welders. For example, the invention has been implemented using an ASTRO ARC wire feeder, from ASTRO ARC, Inc., Sun Valley, Calif. Slip ring model AC4598 from Litton Poly-Scientific, Blacksburg, Va., has been used to power the filler metal delivery system 330.

The laser energy directional modification assembly 392 of FIG. 7 has been implemented using standard lenses. The input lens assembly 396 collimates the laser light beam to form a collimated beam. The input lens assembly 396 includes a window lens 396A, a −20 mm f.l. lens 396B, and a +10 mm f.l. lens 396C. The wedge prism 397 bends the collimated beam (from 10 to 60 degrees, preferably from 20 to 45 degrees, and most preferably approximately 30 degrees) to form a bent and collimated beam. The bent and collimated beam is conveyed to the output lens assembly 398, which includes a +20 mm f.l. lens 398A and a window lens 398B. The output lens assembly 398 forms a focused and collimated beam of a small diameter with very high energy density. The beam provides maximum thermal energy at the point of welding, thereby melting the filler material and a portion of the base material in a controlled manner. The laser energy directional modification assembly 392 has been used at 2400 Watts continuous output, without failure. Prior art devices using mirrors have generally been limited to laser energies of 1000 Watts.

The fixed interior tube 402 of FIG. 9 is preferably formed of stainless steel. The rotating tube 324A of FIG. 9 is preferably formed of stainless steel. Commercially available Nylon or Teflon® bearings are used between the fixed interior tube 402 and the rotating tube 324A.

Having thus described exemplary embodiments of the invention, it is recognized that those skilled in the art will be able to envision and design changes and modifications in the implementation of this invention without departing from the scope and spirit of the invention now claimed.

We claim:

1. A laser welding apparatus for clad welding the interior surface of a tube, comprising:

a laser;

a rotating sleeve, with a first end and a second end, enclosing and rotating a fiber optic cable that receives, at said first end, laser energy from said laser, said rotating sleeve including a filler passage;

a filler metal delivery system in synchronous rotation with said rotating sleeve and delivering a filler material to said filler passage of said rotating sleeve; and a rotating welding head, with a head aperture, positioned at said second end of said rotating sleeve and rotating therewith, said rotating welding head including a laser energy directional modification assembly in synchronous rotation with said rotating sleeve for receiving said energy from said fiber optic cable and directing it through said head aperture to the interior surface of said tube, said filler passage terminating at said head aperture such that said filler material within said filler passage intersects with said energy and thereby fuses with the interior surface of said tube to produce a clad weld.

2. The apparatus of claim 1 wherein said rotating fiber optic cable receives said laser energy from said laser through a stationary to rotating optical coupler.

3. The apparatus of claim 1 wherein said filler metal delivery system is coupled to a filler metal receptacle that feeds said filler material to said filler metal delivery system.

4. The apparatus of claim 1 wherein said laser energy directional modification assembly includes a wedge prism for changing the direction of said laser energy.

5. The apparatus of claim 4 wherein said laser energy impinges upon the interior surface of said tube at a nonorthogonal angle with respect to said tube.

6. The apparatus of claim 1 further comprising an axial drive system for axially positioning said rotating welding head within said heat exchanger tube.

7. A laser welding apparatus for clad welding the interior surface of a heat exchanger tube supported by a tube sheet positioned over a steam generator waterbox, comprising:

a stationary Nd:YAG laser to produce laser energy;

a flexible rotating sleeve for positioning through said steam generator waterbox and into said heat exchanger tube, said flexible rotating sleeve enclosing and rotating a fiber optic cable that receives said laser energy from said stationary Nd:YAG laser, said rotating sleeve including a filler passage;

a filler metal delivery system in synchronous rotation with said rotating sleeve and delivering a filler material to said filler passage of said rotating sleeve; and a rotating welding head, with a head aperture, positioned at the end of said rotating sleeve and rotating therewith, said rotating welding head including a laser energy directional modification assembly for receiving said laser energy from said fiber optic cable and directing it through said head aperture to the interior surface of said tube, said filler passage terminating at said head aperture such that said filler material within said filler passage intersects with said energy and thereby fuses with the interior surface of said tube to produce a clad weld.

8. The apparatus of claim 7 wherein said flexible rotating sleeve includes a gas conduit defined therein.

9. The apparatus of claim 7 wherein said fiber optic cable has a beveled output end.

10. The apparatus of claim 7 wherein said fiber optic cable is bent to form a pre-selected non-orthogonal angle relative to the surface of said tube.

11. The apparatus of claim 7 wherein said fiber optic cable receives said laser energy from said stationary Nd:YAG laser through a stationary to rotating optical coupler.

* * * * *